(12) United States Patent
Utsumi et al.

(10) Patent No.: US 12,444,802 B2
(45) Date of Patent: Oct. 14, 2025

(54) CELL CASE AND MANUFACTURING METHOD OF CELL CASE

(71) Applicant: TOYOTA JIDOSHA KABUSHIKI KAISHA, Toyota (JP)

(72) Inventors: Shintaro Utsumi, Susono (JP); Yuya Kumasaka, Susono (JP); Shunsuke Nagata, Nagakute (JP); Kento Masumura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 746 days.

(21) Appl. No.: 17/729,407

(22) Filed: Apr. 26, 2022

(65) Prior Publication Data
US 2022/0384895 A1 Dec. 1, 2022

(30) Foreign Application Priority Data
Jun. 1, 2021 (JP) .................................. 2021-092399

(51) Int. Cl.
*H01M 50/258* (2021.01)
*H01M 10/04* (2006.01)
(Continued)

(52) U.S. Cl.
CPC ..... *H01M 50/258* (2021.01); *H01M 10/0481* (2013.01); *H01M 50/209* (2021.01);
(Continued)

(58) Field of Classification Search
CPC ........... H01M 50/258; H01M 10/0481; H01M 50/209; H01M 50/224; H01M 50/227; H01M 50/249; H01M 50/244; H01M 50/204; H01M 50/262; H01M 50/293; H01M 2220/20; Y02E 60/10
See application file for complete search history.

(56) References Cited

U.S. PATENT DOCUMENTS

| | | | |
|---|---|---|---|
| 2016/0037690 A1 | 2/2016 | Nomizo et al. | |
| 2020/0106065 A1* | 4/2020 | Ito | H01M 50/229 |
| 2020/0259139 A1 | 8/2020 | Nomizo | |

FOREIGN PATENT DOCUMENTS

| | | |
|---|---|---|
| CN | 105324021 A | 2/2016 |
| CN | 110993841 A | 4/2020 |

(Continued)

*Primary Examiner* — Kiran Quraishi Akhtar
(74) *Attorney, Agent, or Firm* — Sughrue Mion, PLLC (57) ABSTRACT

A cell case includes (i) first and second metal plates constituting a first part of the cell case and placed such that the first and second metal plates are separated from each other (ii) a resin portion provided between the metal plates such that the resin portion connects the first and second metal plates. The first metal plate and the second metal plate include a first overlapped portion and a second overlapped portion, respectively, such that the first overlapped portion and the second overlapped portion overlap with each other via the resin portion. The first overlapped portion includes a hook. The second overlapped portion has an opening. The hook is formed to be caught on the opening to restrict relative displacement between the first metal plate and the second metal plate along a direction where the first metal plate and the second metal plate are separated from each other.

4 Claims, 11 Drawing Sheets

(51) Int. Cl.
*H01M 50/209* (2021.01)
*H01M 50/224* (2021.01)
*H01M 50/227* (2021.01)

(52) U.S. Cl.
CPC ....... *H01M 50/224* (2021.01); *H01M 50/227* (2021.01); *H01M 2220/20* (2013.01)

(56) References Cited

FOREIGN PATENT DOCUMENTS

| | | |
|---|---|---|
| CN | 111554839 A | 8/2020 |
| JP | 2003-272569 A | 9/2003 |
| JP | 2019-16596 A | 1/2019 |
| JP | 2020-129474 A | 8/2020 |

\* cited by examiner

FIG. 8A BEFORE FORMING OF HOOK

FORM HOOK BY PRESS MOLDING

FIG. 8B AFTER FORMING OF HOOK

FIG. 8C AFTER PUNCHING OF OPENING

FIG. 8D SUBASSEMBLING SLIDE

FIG. 8E PUT HOOK THROUGH OPENING

FIG. 8F PUT HOOK ON OPENING

FIG. 8G METAL MOLD SET STATE

METAL MOLD SET STATE

FIG. 11B

AUXILIARY LOCK AT SOFTENING OR MELTING OF RESIN PORTION

CELL CASE AND MANUFACTURING METHOD OF CELL CASE

CROSS-REFERENCE TO RELATED APPLICATION

This application claims priority to Japanese Patent Application No. 2021-092399 filed on Jun. 1, 2021, incorporated herein by reference in its entirety.

BACKGROUND

1. Technical Field

This disclosure relates to a cell case and a manufacturing method of a cell case.

2. Description of Related Art

Japanese Unexamined Patent Application Publication No. 2020-129474 (JP 2020-129474 A) describes a cell case in which stacked battery cells are accommodated. The cell case is constituted by a metal case member and a resin case member provided to cover the metal case member from its outside. The metal case member is formed into a box shape by bending one metal plate. The resin case member is formed by injection molding of resin and fixed to the metal case member such that the resin case member is integrated with the metal case member.

SUMMARY

In order to raise a degree of freedom in shape in a cell case formed by combining a metal plate with a resin member like the cell case described in JP 2020-129474 A, it is conceivable to employ a configuration including a metal plate portion including a plurality of metal plates placed such that the metal plates are separated from each other and a resin portion via which the metal plates are connected to each other. However, in such a configuration, in a case where the resin portion softens or melts under a high temperature environment, the metal plates might disassemble from each other, so that battery cells might fall apart.

This disclosure is accomplished in view of the above problems, and an object of this disclosure provides a cell case including a metal plate portion including a plurality of metal plates placed such that the metal plates are separated from each other, and a resin portion via which the metal plates are connected to each other, the batter case being configured such that the metal plates are hard to disassemble from each other in a case where the resin portion softens or melts under a high temperature environment.

A cell case according to this disclosure is a cell case in which one or more battery cells are accommodated and includes a metal plate portion and a resin portion. The metal plate portion includes a plurality of metal plates constituting a first part of the cell case and placed such that the metal plates are separated from each other. The resin portion is provided between the metal plates such that the resin portion connects the metal plates, the resin portion constituting a second part of the cell case. The metal plates include a first metal plate and a second metal plate. The first metal plate and the second metal plate include a first overlapped portion and a second overlapped portion, respectively, such that the first overlapped portion and the second overlapped portion overlap with each other via the resin portion. The first overlapped portion includes a hook. The second overlapped portion has an opening. The hook is formed to be caught on the opening to restrict relative displacement between the first metal plate and the second metal plate along a direction where the first metal plate and the second metal plate are separated from each other.

The one or more battery cells may form a cell stack as a stacked body constituted by a plurality of battery cells stacked in a stacking direction. The direction where the first metal plate and the second metal plate are separated from each other may be a direction parallel to the stacking direction.

The first overlapped portion may include a contacting projection formed in the hook or formed in the first overlapped portion at a position different from the hook such that the contacting projection projects toward the second overlapped portion. The second overlapped portion may directly make contact with the contacting projection.

The hook may be formed by bending part of the first overlapped portion.

A manufacturing method of a cell case according to this disclosure is a method for manufacturing a cell case in which one or more battery cells are accommodated. The cell case includes a metal plate portion including a plurality of metal plates constituting a first part of the cell case and placed such that the metal plates are separated from each other, and a resin portion provided between the metal plates such that the resin portion connects the metal plates, the resin portion constituting a second part of the cell case. The metal plates includes a first metal plate and a second metal plate. The first metal plate and the second metal plate include a first overlapped portion and a second overlapped portion, respectively, such that the first overlapped portion and the second overlapped portion overlap with each other via the resin portion. The first overlapped portion includes a hook. The second overlapped portion has an opening. The hook is formed to be caught on the opening to restrict relative displacement between the first metal plate and the second metal plate along a direction where the first metal plate and the second metal plate are separated from each other.

The manufacturing method includes a press molding step, a setting step, and an injection molding step. In the press molding step, the metal plates are formed by press molding. In the setting step, the metal plates are set in a metal mold after the press molding step. In the injection molding step, the cell case is formed by molding the resin portion by filling resin between the metal plates set in the setting step. The press molding step includes a hook forming step of forming the hook by press molding, and an opening forming step of forming the opening by press molding.

The first overlapped portion may include a contacting projection formed in the hook or formed in the first overlapped portion at a position different from the hook such that the contacting projection projects toward the second overlapped portion. The second overlapped portion may directly make contact with the contacting projection. The press molding step may include a projection forming step of forming the contacting projection by press molding.

The manufacturing method may further include a temporary assembling step of temporarily assembling the first metal plate and the second metal plate by hooking the hook on the opening, after the press molding step but before the setting step.

In the cell case according to this disclosure, the first metal plate and the second metal plate included in the metal plates placed to be separated from each other via the resin portion include the first overlapped portion and the second overlapped portion, respectively. The hook is formed in the first overlapped portion, and the opening is formed in the second overlapped portion. The hook is formed to be caught on the opening to restrict relative displacement between the first metal plate and the second metal plate along the direction where the first metal plate and the second metal plate are separated from each other. Hereby, even in a case where the resin portion softens or melts under a high temperature environment, the first metal plate and the second metal plate can be made hard to disassemble from each other. Accordingly, when any pair of metal plates adjacent to each other among the metal plates satisfies the relationship between the first metal plate and the second metal plate, it is possible to restrain disassembling between the metal plates.

In the manufacturing method of the cell case according to this disclosure, the hook and the opening are formed by press molding. Hereby, it is possible to form the hook and the opening just by additionally performing the hook forming step and the opening forming step each using press molding on the first metal plate and the second metal plate formed by press molding. Accordingly, it is possible to minimize addition of manufacturing steps and to manufacture a cell case that is able to restrain disassembling between a plurality of metal plates.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In embodiments to be described below, elements common in the drawings have the same reference sign, and redundant descriptions are omitted or simplified. Further, when any number such as the number, quantity, amount, or range of each element is referred to in the following embodiments, the technical idea of this disclosure is not limited to the referred number except when the number is particularly explicitly indicated or the element is obviously specified to the number in principle. Moreover, the structure and so on described in the following embodiments are not necessarily indispensable to the technical idea of this disclosure except when they are particularly explicitly indicated or obviously specified in principle.

1. Embodiment 1

1-1. Configuration of Cell Case

Figure 1:
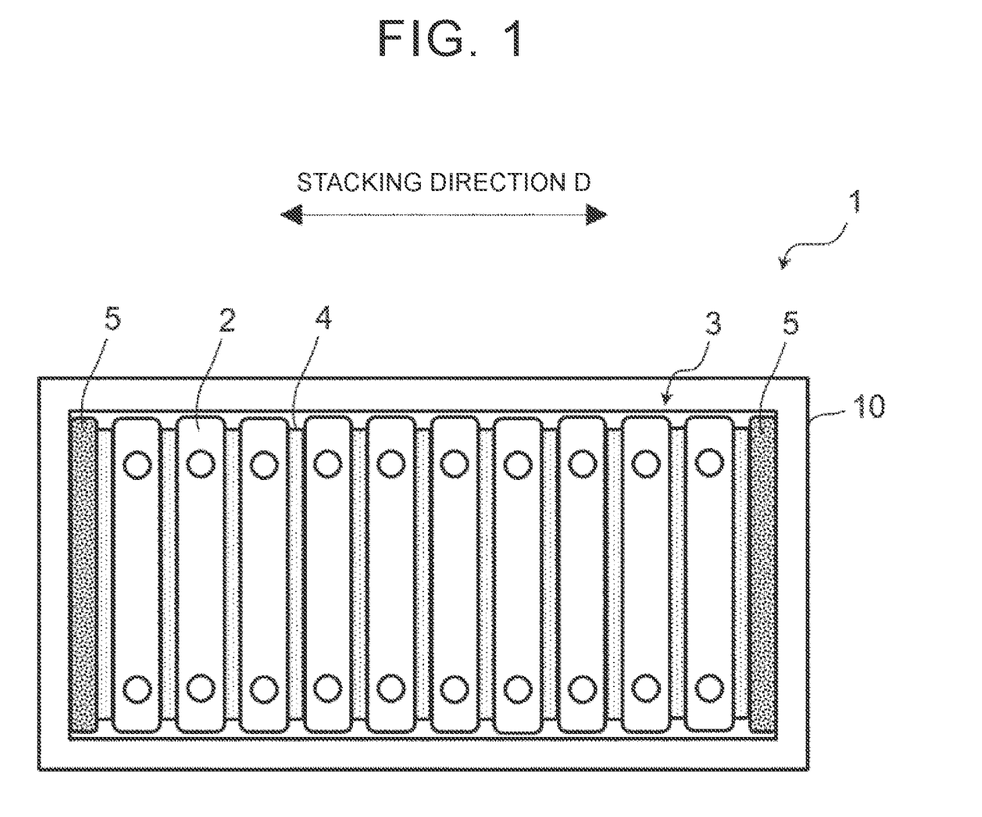
FIG. 1 is a top face view of a battery pack including a cell case according to Embodiment 1.

FIG. 1 is a top face view of a battery pack 1 including a cell case 10 according to Embodiment 1. The battery pack 1 includes a cell stack 3 as a stacked body constituted by stacking a plurality of battery cells 2, and a cell case 10 in which the cell stack 3 is accommodated. The battery pack 1 is provided in an electrified vehicle and supplies electric power to the electrified vehicle.

More particularly, in one example illustrated in FIG. 1, the cell stack 3 is constituted such that a plurality of square battery cells 2 and spacers (resin frames) 4 are stacked alternately. The cell stack 3 includes a pair of end plates 5 placed such that an assembly body including the battery cells 2 and the spacers 4 is sandwiched between the end plates 5 from both sides in a stacking direction D. The spacer 4 is made of insulating resin. The spacer 4 secures an insulating property between the battery cells 2 adjacent to each other and functions as a heat dissipation path for the battery cells 2. The cell stack 3 having such a configuration is accommodated in the cell case 10 in a state where compressive loads are applied from respective sides of the end plate 5 placed at both ends of the cell stack 3. Note that the plurality of battery cells 2 may not be necessarily accommodated in the cell case 10, and only one battery cell 2 may be accommodated in the cell case 10. Further, the "cell case" according to this disclosure may be formed such that a cell stack in which the battery cells 2 are arranged in two or more lines is accommodated in the cell case.

Figure 2:
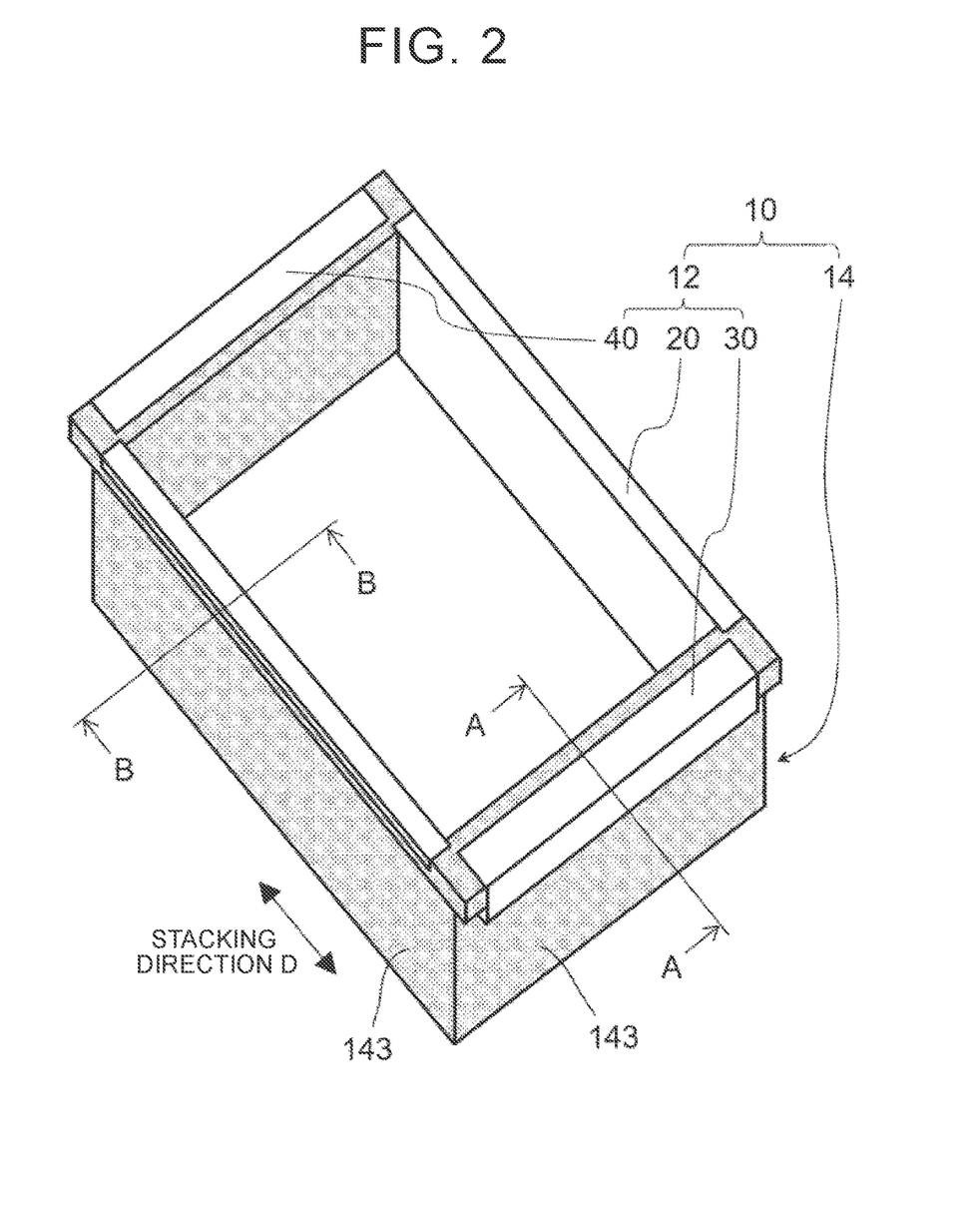
FIG. 2 is a perspective view of the cell case according to Embodiment 1.

FIG. 2 is a perspective view of the cell case 10 according to Embodiment 1. The cell case 10 has a generally rectangular solid shape and is constituted by an upper cover (not illustrated) constituting an upper face of the cell case 10 and a lower case constituting a bottom face and four side faces of the cell case 10. The lower case in the cell case 10 is illustrated in FIG. 2. That is, the lower case has a generally rectangular solid shape the upper face of which is opened.

Figure 3:
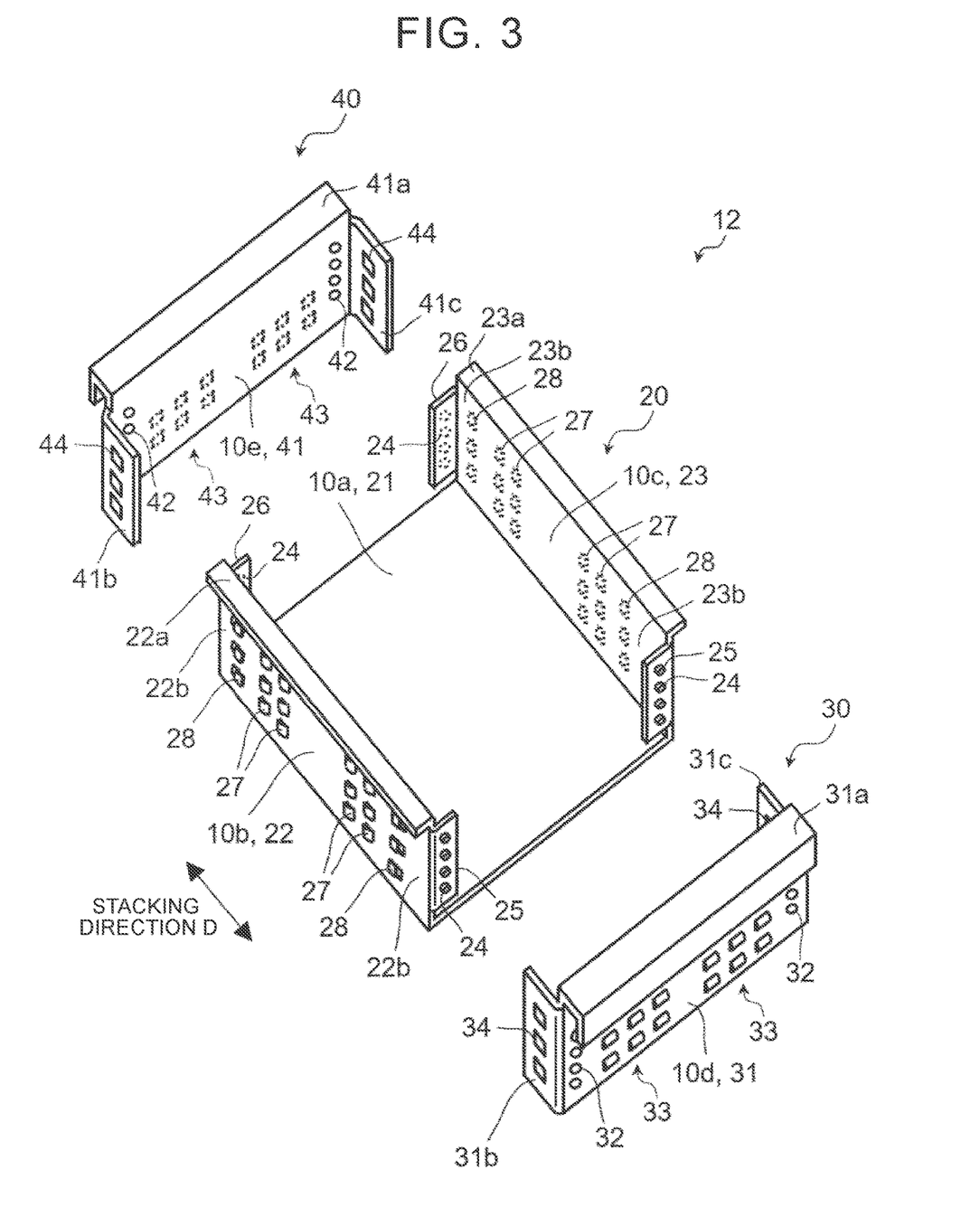
FIG. 3 is an exploded perspective view of a metal plate portion illustrated in FIG. 2.
Figure 4:
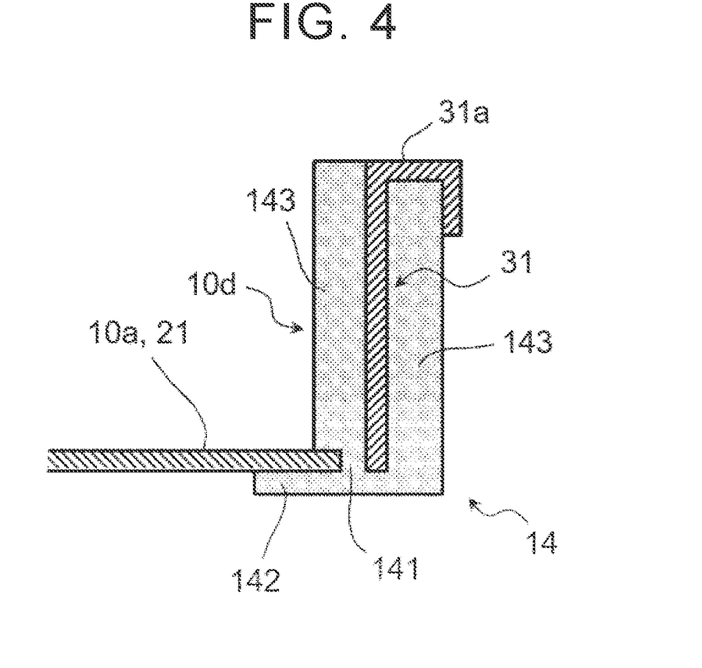
FIG. 4 is a sectional view taken along a line A-A in FIG. 2.
Figure 5:
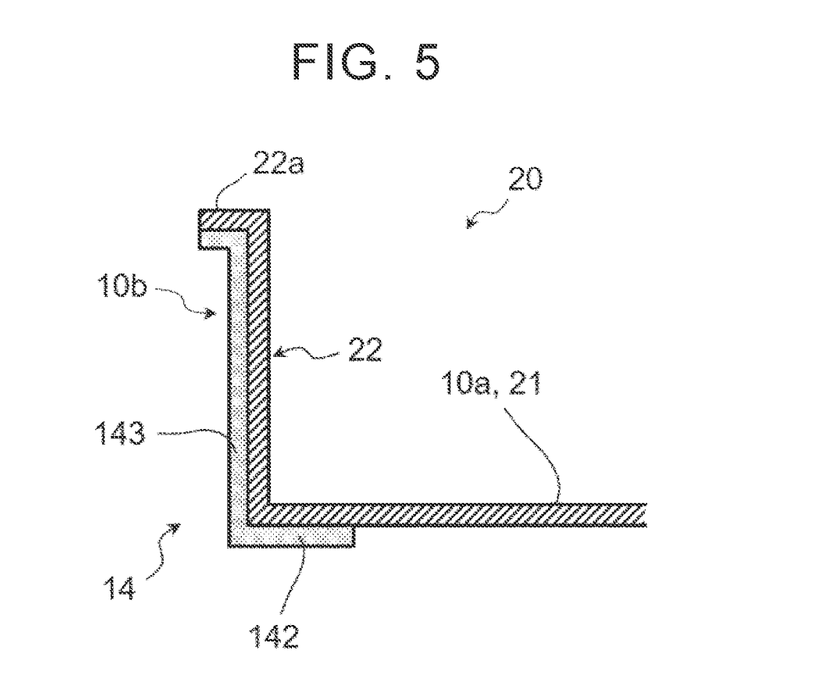
FIG. 5 is a sectional view taken along a line B-B in FIG. 2.

With reference to FIGS. 3 to 5 as well as FIG. 2, the configuration of the cell case 10 (the lower case) will be described. The cell case 10 (the lower case) is constituted by a metal plate portion 12 and a resin portion 14. FIG. 3 is an exploded perspective view of the metal plate portion 12 illustrated in FIG. 2. FIG. 4 is a sectional view taken along a line A-A in FIG. 2. FIG. 5 is a sectional view taken along a line B-B in FIG. 2.

As illustrated in FIG. 3, the metal plate portion 12 is constituted by a plurality (e.g., three) metal plates 20, 30, 40 separated from each other. The material for the metal plate 20 and so on is not limited in particular, but the material is, for example, a steel sheet, a galvanized steel plate, a nickel-plating steel sheet, a stainless-steel plate, or an aluminum plate.

As illustrated in FIGS. 2, 3, 5, the metal plate 20 includes a bottom wall portion 21 constituting a bottom face 10a of the cell case 10, and a pair of side wall portions 22, 23 constituting a pair of side faces 10b, 10c provided such that the side faces 10b, 10c face each other. More particularly, the bottom wall portion 21 and the side wall portions 22, 23 each have a rectangular basic shape. Then, the side wall portions 22, 23 rise from the bottom wall portion 21 to the upper side of the cell case 10 and extend. Further, in order to increase the rigidity of the side wall portions 22, 23, respective ends of the side wall portions 22, 23 on a side opposite to the bottom wall portion 21 are bent by 90 degrees. Hereby, flange portions 22a, 23a having L-shaped sections are formed.

As illustrated in FIGS. 2, 3, 4, the metal plate 30 mainly includes a side wall portion 31 constituting a side face 10d of the cell case 10. More particularly, the side wall portion 31 has a rectangular basic shape. As illustrated in FIG. 4, the side wall portion 31 is separated from the bottom wall portion 21 of the metal plate 20, but the side wall portion 31 rises from the bottom wall portion 21 side to the upper side of the cell case 10. Further, in order to increase the rigidity of the side wall portion 31, an end of the side wall portion 31 on the side opposite to the bottom wall portion 21 is bent twice by 90 degrees. Hereby, a flange portion 31a having a lateral square-U-shaped section is formed.

The metal plate 40 includes a side wall portion 41 constituting a side face 10e facing the side face 10d of the cell case 10, the side face 10d being constituted by the side wall portion 31 of the metal plate 30. The metal plate 40 has the same shape as the metal plate 30 as one example. That is, the metal plate 40 includes a flange portion 41a having the same shape as the flange portion 31a. Further, the metal plate 40 includes a through-hole 42, an overlapped portion 41b, and a projection 43 having the same shapes as a through-hole 32, an overlapped portion 31b, and a projection 33 (described later), respectively.

As understood from the sectional view illustrated in FIG. 4, the three metal plates 20, 30, 40 described above are placed to be separated from each other without directly making contact with each other even in a state where the cell case 10 (the lower case) illustrated in FIG. 2 is completed.

The metal plates 20, 30, 40 are connected via the resin portion 14. The material for the resin portion 14 is not particularly limited, but the material is, for example, thermoplastic resin such as polyamide, thermosetting resin such as epoxy, or fiber reinforced plastic such as fiberglass-reinforced polyamide. As illustrated in FIGS. 2, 4, the resin portion 14 is provided between the three metal plates 20, 30, 40 so as to connect the metal plates 20, 30, 40.

More particularly, in order to hold the three metal plates 20, 30, 40 separated from each other, the resin portion 14 is formed as follows. That is, as illustrated in FIG. 4, in order to hold the bottom wall portion 21 of the metal plate 20 and the side wall portion 31 of the metal plate 30 in a separated state, the resin portion 14 includes an interposed resin portion 141 provided between the bottom wall portion 21 and the side wall portion 31. The same can be applied to the relationship between the metal plate 20 and the metal plate 40.

Further, as illustrated in FIGS. 2, 4, 5, the resin portion 14 includes box-shaped parts covering the metal plates 20, 30, 40 from outside the cell case 10 for the bottom face 10a and four side faces 10b to 10e of the cell case 10. A bottom wall resin portion 142 illustrated in FIGS. 4, 5 and a squarely cylindrical side wall resin portion 143 illustrated in FIGS. 2, 4, 5 correspond to the box-shaped parts as used herein. Since the resin portion 14 includes the box-shaped parts, the resin portion 14 can receive, together with the metal plate portion 12, a reaction force from a compressive load applied to the cell stack 3 and an external force applied to each of the side faces 10b to 10e of the cell case 10 from outside the cell case 10. Note that a predetermined number of brackets (not illustrated) configured to fix the cell case 10 to a vehicle body are fastened to nuts (not illustrated) fitted by pressing to the resin portion 14 (for example, the side wall resin portion 143).

As mentioned earlier, the resin portion 14 has a function to connect the metal plate portion 12 (the metal plates 20, 30, 40) forming a basic framework of the cell case 10 and also functions as part of the cell case 10, and the resin portion 14 contributes to securing of the rigidity and the strength of the cell case 10. Note that, in the example illustrated in FIGS. 4, 5, the resin portion 14 covers only edge parts of the bottom face 10a.

However, instead of such an example, the resin portion 14 may cover the whole bottom face 10a outside the bottom wall portion 21.

In order to more surely fix (connect) the metal plates 20, 30, 40 to the resin portion 14, the cell case 10 has the following "entangled structure." The entangled structure as used herein is a structure for reinforcing the connection between the metal plate 20 and so on and the resin portion 14 by mechanically entangling the metal plate 20 and so on with the resin portion 14 without the use of bonding.

More specifically, the entangled structure is achieved by a combination of projections 24 formed in the metal plate 20 with through-holes 32, 42 formed in the metal plates 30, 40, for example. As illustrated in FIG. 3, the metal plate 20 includes opposite wall portions 25, 26 facing the side wall portions 31, 41, respectively. The opposite wall portions 25, 26 are formed by bending part of the side wall portions 22, 23, respectively. The projections 24 are formed in the opposite wall portions 25, 26. As well illustrated in FIGS. 6A, 6B (described later), the projections 24 each have a cylindrical shape projecting toward a corresponding one of the side wall portions 31, 41. The projections 24 each penetrate through a corresponding one of the through-holes 32, 42 without making contact with the corresponding one of the through-holes 32, 42. A gap between the opposite wall portion 25, 26 including the projections 24 and a corresponding one of the side wall portions 31, 41 is filled with the resin portion 14. With the entangled structure using the projections 24 having a cylindrical shape and the through-holes 32, 42, it is possible to surely fix (connect) the metal plate 20 and so on to the resin portion 14, and furthermore, it is possible to more surely fix (connect) the metal plate 20 with each of the metal plates 30, 40 via the resin portion 14, in comparison with a case where the wall portion of the resin portion 14 is formed to just make contact with plane parts of the metal plate 20 and so on.

Figure 6A:
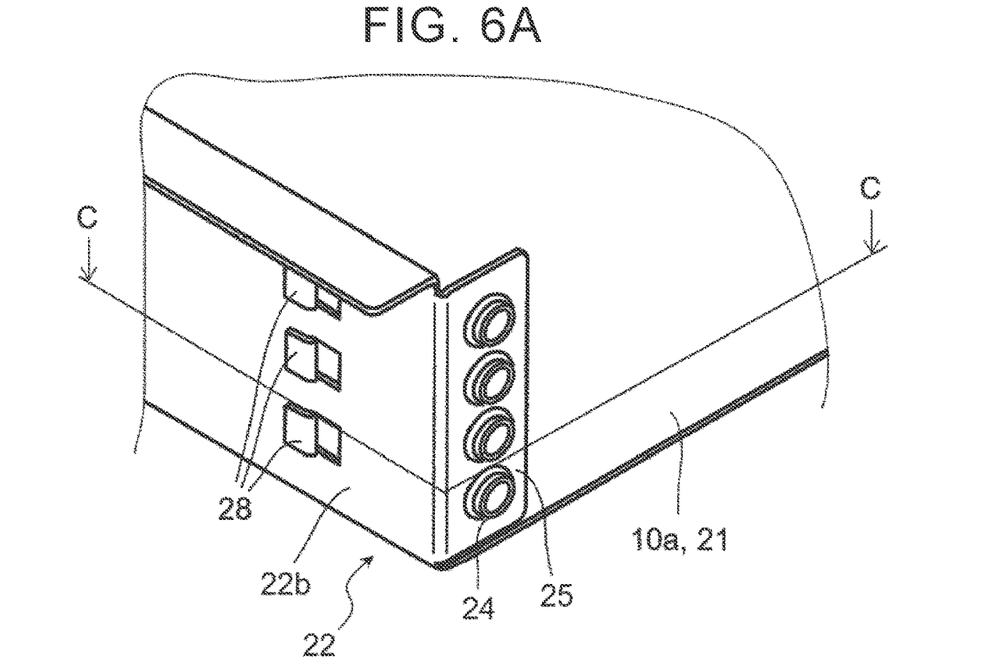
FIG. 6A is an enlarged perspective view of the cell case to describe an auxiliary lock structure according to Embodiment 1.
Figure 6B:
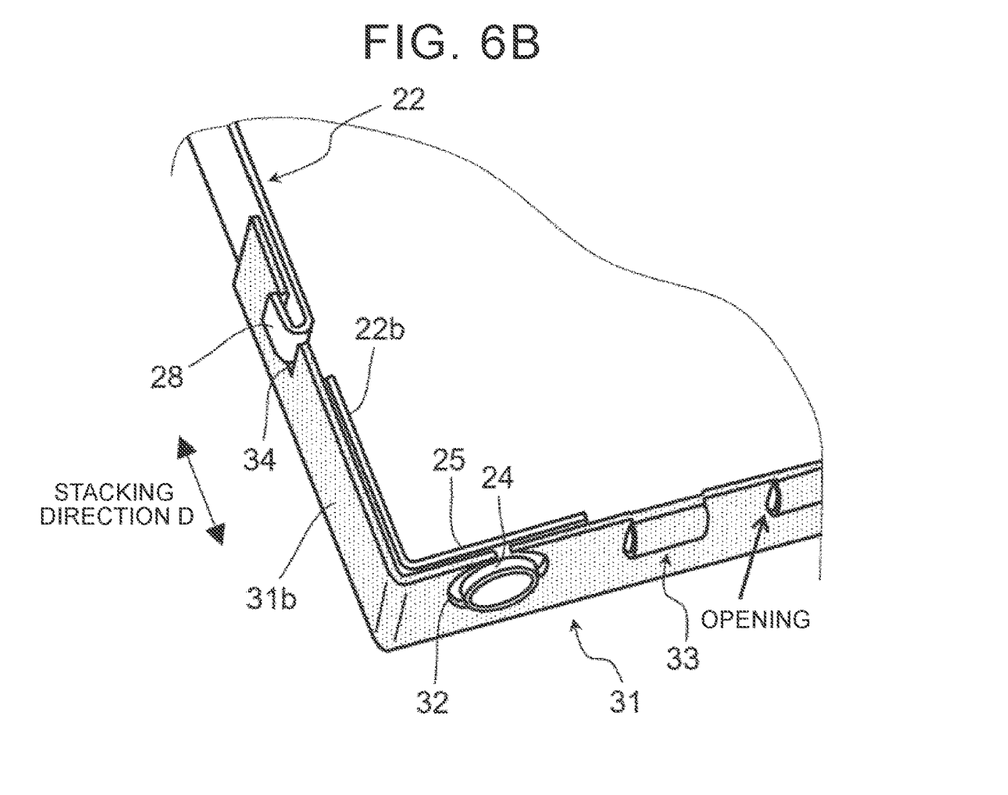
FIG. 6B is an enlarged perspective view of the cell case to describe the auxiliary lock structure according to Embodiment 1.

Further, the entangled structure is also achieved by, for example, projections 27, 33, 43 having an arch shape. As illustrated in FIG. 3, the projections 27 are formed in the side wall portions 22, 23, and the projections 33, 43 are formed in the side wall portion 31 and the side wall portion 41, respectively. The projections 27, 33, 43 having an arch shape as used herein are opened at both ends of their arch portions as illustrated in FIGS. 6A, 6B (described later). Hereby, it is possible to successfully entangle the metal plate 20 and so on with the resin portion 14. Accordingly, with such an entangled structure using the projections 27 and so on having an arch shape, it is possible to more surely fix (connect) each of the metal plates 20, 30, 40 with the resin portion 14, in comparison with a case where the wall portion of the resin portion 14 is formed to just make contact with plane parts of the metal plate 20 and so on.

As described above, with the cell case 10 formed by combining the resin portion 14 with the metal plate 20 and so on separated from each other, it is possible to increase a degree of freedom in shape for a case in comparison with an example where a cell case is constituted by a combination of a reception member with a metal case member formed in a box shape by bending one metal plate.

Here, in a cell case having a basic configuration in which a metal plate portion constituted by a plurality of metal plates is connected via a resin portion like the cell case 10, the metal plates are fixed to each other just by resin. Accordingly, when the resin portion softens or melts under a high temperature environment, the metal plates might disassemble from each other due to a decrease in joining strength between the metal plates, and the battery cells might fall apart.

1-1-1. Auxiliary Lock Structure of Cell Case

In view of the abovementioned object, the cell case 10 of the present embodiment has the following contact structure. FIGS. 6A, 6B are enlarged perspective views of the cell case 10 to describe an auxiliary lock structure according to Embodiment 1. More particularly, FIG. 6A illustrates the shape of an end part of the side wall portion 22 on the side wall portion 31 side in an enlarged manner, and FIG. 6B is a perspective sectional view of the side wall portions 22, 31 including a section take along a line C-C line in FIG. 6A.

The side wall portion 22 of the metal plate 20 and the side wall portion 31 of the metal plate 30 include respective overlapped portions 22b, 31b overlapping with each other via the resin portion 14. The overlapped portion 22b includes hooks 28. Meanwhile, the overlapped portion 31b has openings 34 at respective position facing the hooks 28. The opening 34 has a size that allows the hook 28 to pass through the inside of the opening 34. The hooks 28 are formed to be caught on the openings 34 to restrain relative displacement between the metal plate 20 and the metal plate 30 along a direction where the metal plate 20 and the metal plate 30 are separated from each other. More specifically, in the present embodiment, the "direction where the metal plate 20 and the metal plate 30 are separated from each other" as used herein represents a direction parallel to the stacking direction D of the cell stack 3.

In addition, in one example illustrated in FIGS. 6A, 6B, the overlapped portion 31b on the metal plate 30 side is a part (that is, an extended part) formed by bending part of the side wall portion 31 of the metal plate 30 so as to form the openings 34 on which the hooks 28 are hooked. The overlapped portion 31b is formed in a flat-plate shape by press molding by bending part of the side wall portion 31 by 90 degrees such that the overlapped portion 31b overlaps with the overlapped portion 22b while a gap to be filled with the resin portion 14 is formed between the overlapped portion 31b and the overlapped portion 22b.

Further, similarly, in the side wall portion 23 of the metal plate 20 on a side opposite to the side wall portion 22 and the side wall portion 31, overlapped portions 23b, 31c overlapping with each other via the resin portion 14 are provided, as illustrated in FIG. 3. The hooks 28 are formed in the overlapped portion 23b similarly to the overlapped portion 22b, and the openings 34 corresponding to the hooks 28 are formed in the overlapped portion 31c similarly to the overlapped portion 31b.

Note that, in the example illustrated in FIGS. 6A, 6B, the metal plate 20 including the overlapped portion 22b corresponds to an example of a "first metal plate including a first overlapped portion" according to this disclosure, and the metal plate 30 including the overlapped portions 31b, 31c corresponds to an example of a "second metal plate including a second overlapped portion" according to this disclosure. Further, in the example illustrated in FIGS. 6A, 6B, three hooks 28 are provided on each side of the side wall portions 22, 23, but instead of this, one or two hooks 28 may be provided, or four or more hooks 28 may be provided.

Figure 10:
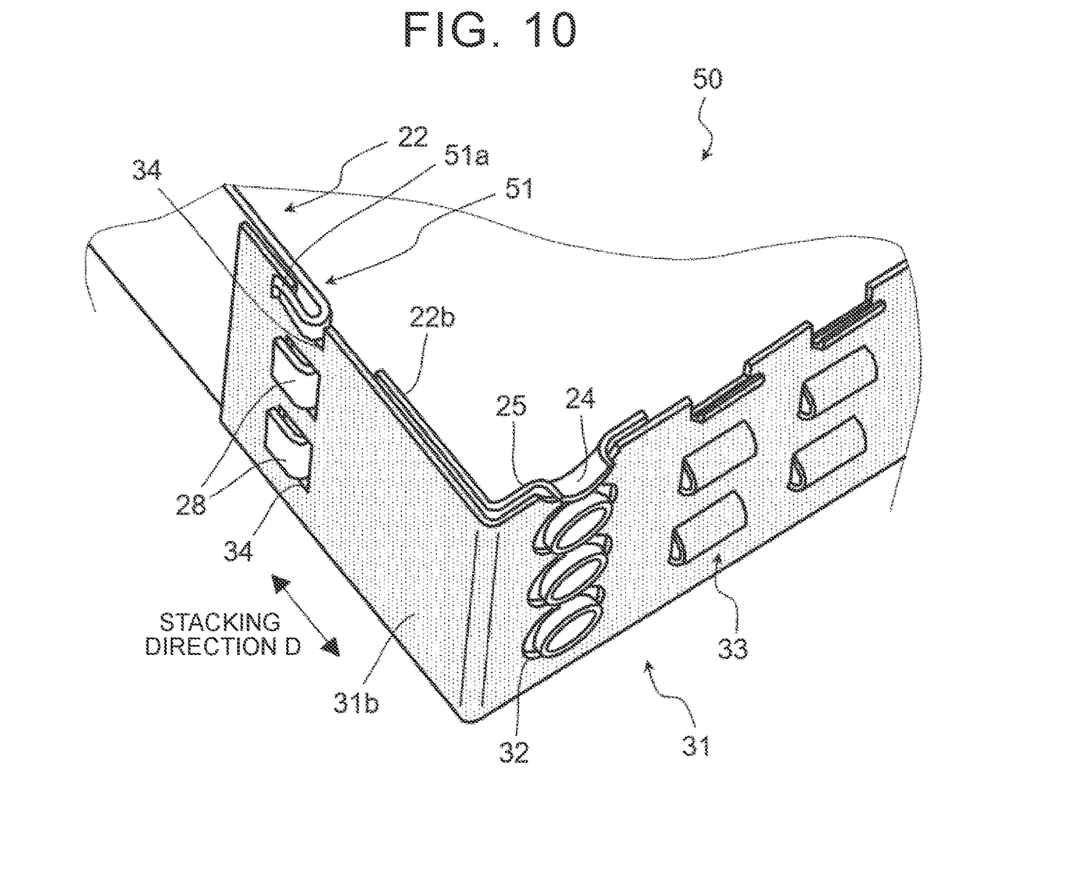
FIG. 10 is a perspective sectional view to describe a configuration of a cell case according to Embodiment 2.

Although not described herein, a similar auxiliary lock structure is also applied to between the metal plate 20 and the metal plate 40. That is, as illustrated in FIG. 3, the side wall portion 22 of the metal plate 20 and the side wall portion 41 of the metal plate 40 include respective overlapped portions 22b, 41B overlapping with each other via the resin portion 14. The hooks 28 are formed in the overlapped portion 22b on a side closer to the side wall portion 41, and openings 44 corresponding to the hooks 28 are formed in the overlapped portion 41b of the side wall portion 41. Further, the hooks 28 and the openings 44 are also provided in the overlapped portion 23b in the side wall portion 23 of the metal plate 20 on the side opposite to the side wall portion 22 and an overlapped portion 41c of the side wall portion 41. Note that, in the relationship between the metal plate 20 and the metal plate 40, the metal plate 20 and the metal plate 40 correspond to other examples of the "first metal plate" and the "second metal plate" according to this disclosure.

Further, the auxiliary lock structure is provided on both the side wall portion 22 side and the side wall portion 23 side in the metal plate 20. However, instead of this, the auxiliary lock structure may be provided only on either of the side wall portion 22 side and the side wall portion 23 side. Further, the "hook" according to this disclosure may be provided on the overlapped portion 31b side and the overlapped portion 41b side that are parts extended to overlap with the overlapped portions 22b, instead of the metal plate 20 side. Further, the "opening" according to this disclosure may be provided on the overlapped portion 22b side and the overlapped portion 23b side of the metal plate 20 so as to correspond to this.

1-2. Manufacturing Method of Cell Case

Figure 7:
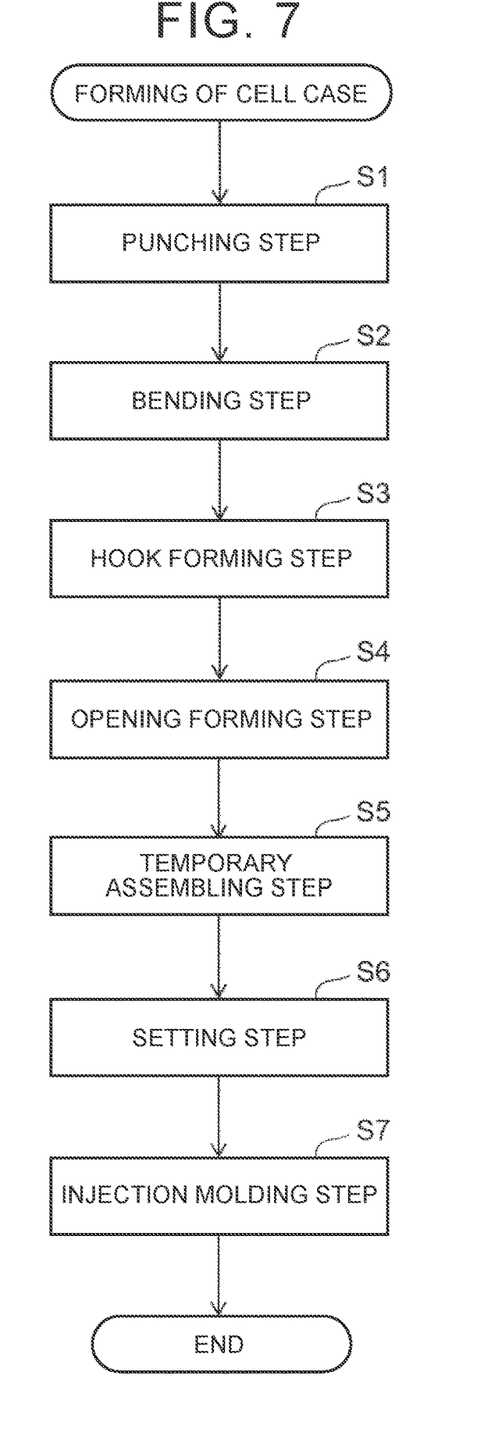
FIG. 7 is a flowchart illustrating the procedure of a manufacturing method of the cell case according to Embodiment 1.

Next will be described a manufacturing method of the cell case 10 according to the present embodiment with reference to FIG. 7 and FIGS. 8A to 8G. FIG. 7 is a flowchart illustrating the procedure of the manufacturing method of the cell case 10 according to Embodiment 1. More particularly, FIG. 7 illustrates main steps when the cell case 10 is manufactured (formed) by use of press working by a pressing machine and injection molding by an injection molding machine. FIGS. 8A to 8G are views to describe formation of the hooks 28 and the openings 34, 44 and subassembling of the metal plates 20, 30, and 40.

First, in punching step S1, punching is performed by the pressing machine so as to form, from a hoop-shaped metal plate, metal plates (that is, flat-shaped metal plates in respective expanded shapes of the metal plate 20 and so on) to become the metal plates 20, 30, 40. Note that the through-holes 32, 42 of the metal plates 30, 40 may be formed at the same time in punching step S1 or may be formed in subsequent another step.

Subsequently, in bending step S2, each part of each metal plate obtained in punching step S1 is bent by the pressing machine, so that the metal plates 20, 30, 40 are formed individually by press molding.

Figures 8A, 8B:
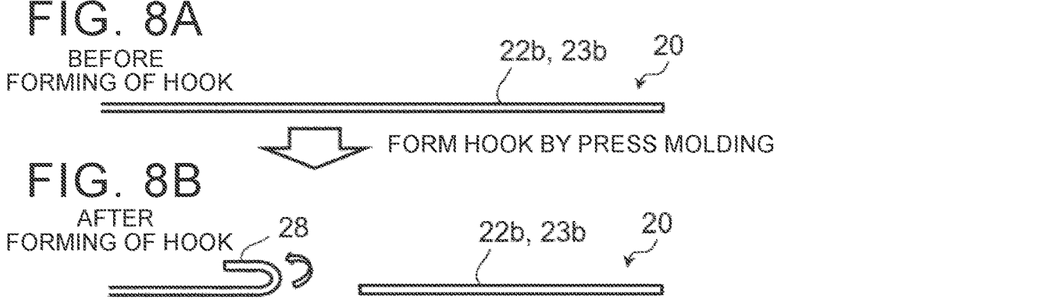
FIG. 8A is a view to describe formation of a hook and an opening and subassembling of metal plates.
FIG. 8B is a view to describe the formation of the hook and the opening and the subassembling of the metal plates.

Subsequently, in hook forming step S3, the hooks 28 of the metal plate 20 (the side wall portions 22, 23) are formed by press molding. Here, with reference to FIGS. 8A, 8B, the formation of the hooks 28 is supplementarily described. By performing press molding on the overlapped portion 22b, 23b, the hook 28 is formed such that part of the overlapped portion 22b, 23b is bent as illustrated in FIG. 8B.

Figure 8C:
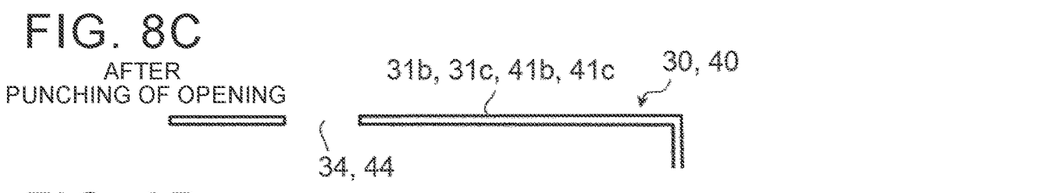
FIG. 8C is a view to describe the formation of the hook and the opening and the subassembling of the metal plates.

Subsequently, in opening forming step S4, the openings 34, 44 of the metal plates 30, 40 are formed by press molding, respectively. More specifically, by performing press molding on the overlapped portion 31b, 31c, 41b, 41c, the opening 34, 44 is formed as illustrated in FIG. 8C. Note that the opening 34, 44 may be formed at the same time as the other through-holes 32 in punching step S1.

Note that, in the example illustrated in FIG. 7, a combination of punching step S1, bending step S2, hook forming step S3, and opening forming step S4 corresponds to an example of a "press molding step" according to this disclosure.

Figure 8D:
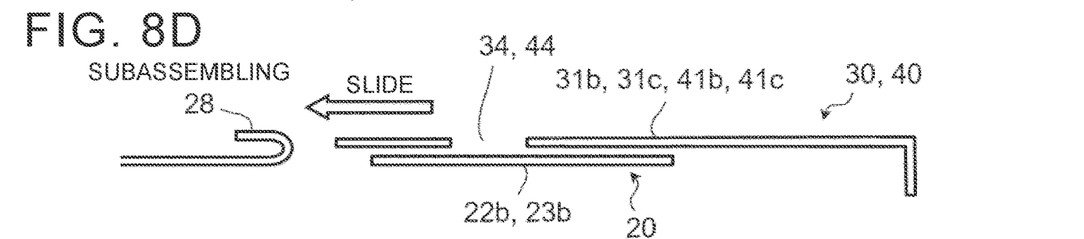
FIG. 8D is a view to describe the formation of the hook and the opening and the subassembling of the metal plates.
Figure 8E:
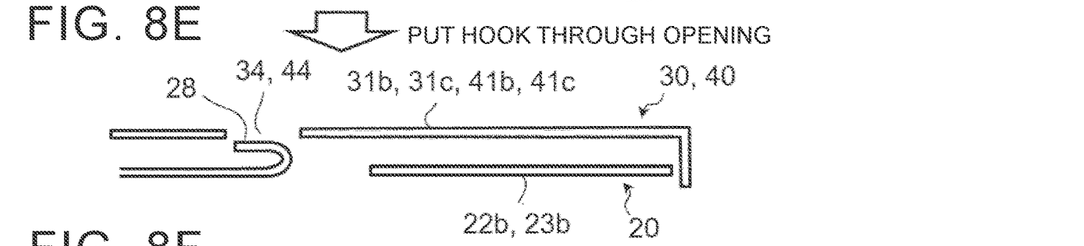
FIG. 8E is a view to describe the formation of the hook and the opening and the subassembling of the metal plates.
Figures 8F, 8G:
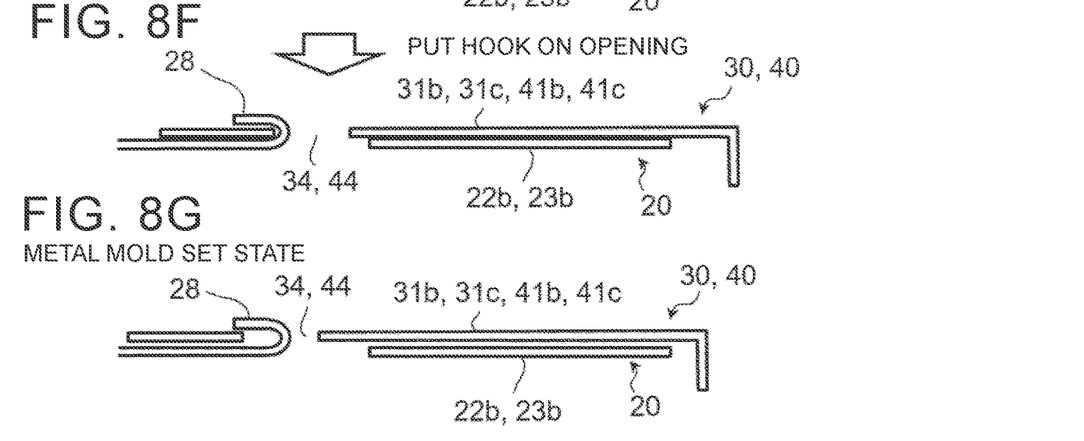
FIG. 8F is a view to describe the formation of the hook and the opening and the subassembling of the metal plates.
FIG. 8G is a view to describe the formation of the hook and the opening and the subassembling of the metal plates.

Subsequently, temporary assembling step S5 is performed after the "press molding step" but before setting step S6. In temporary assembling step S5, the hooks 28 are hooked on the openings 34, 44, so that the metal plate 20 is temporarily assembled with the metal plates 30, 40. More specifically, first, in order to put the hook 28 through the opening 34, 44 as illustrated in FIGS. 8D, 8E, the metal plate 30 is slid to a position where the opening 34, 44 fits the hook 28 while the overlapped portion 31b and the like is overlapped with the overlapped portion 22b or the like. Subsequently, as illustrated in FIG. 8F, the hook 28 is hooked on the opening 34, 44. Hereby, the metal plates 20, 30, 40 are temporarily assembled in a subassembling state.

Subsequently, in setting step S6, the subassembly of the metal plates 20, 30, 40 temporarily assembled in temporary assembling step S5 is set in a metal mold of the injection molding machine. FIG. 8G illustrates the metal plates 20, 30, 40 in a state set in the metal mold.

Subsequently, in injection molding step S7, resin is injected (filled) between the metal plates 20, 30, 40 set in setting step S6, so that the resin portion 14 fixed to the metal plates 20, 30, 40 is molded. As a result, the cell case 10 of the present embodiment is formed (manufactured).

1-3. Effects

Figure 9:
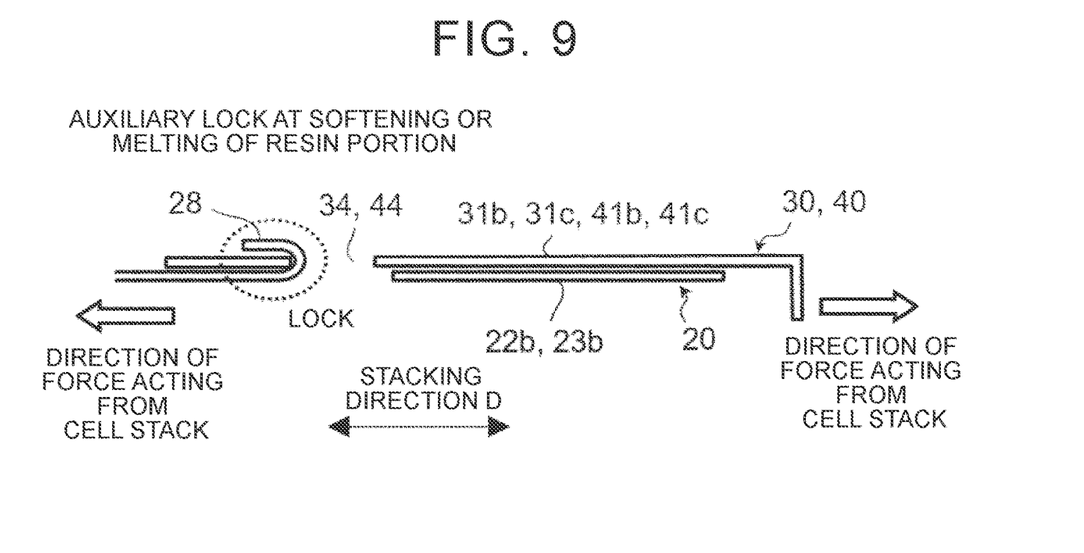
FIG. 9 is a view to describe an effect of the cell case according to Embodiment 1.

FIG. 9 is a view to describe effects of the cell case 10 according to Embodiment 1. As described above, the cell case 10 has the auxiliary lock structure using the hooks 28 and the openings 34, 44. That is, the metal plate 20 and the metal plate 30 placed to be separated from each other via the resin portion 14 include the overlapped portions 22b, 23b and the overlapped portions 31b, 31c, respectively. The openings 34 are formed in the overlapped portions 31b, 31c, and the hooks 28 are formed in the overlapped portions 22b, 23b.

Here, the cell case 10 receives a reaction force from a compressive load applied to the cell stack 3 as described above. As illustrated in FIG. 9, the reaction force (a force acting from the cell stack 3) acts on the cell case 10 (more specifically, the side face 10d on the side wall portion 21 side and the side face 10e on the side wall portion 41 side) such that the metal plate 20 and the metal plate 30 are separated from each other in a direction parallel to the stacking direction D. In a case where the resin portion 14 softens or melts under a high temperature environment, the hook 28 is caught on the opening 34 as illustrated in FIG. 9, thereby making it possible to restrain relative displacement between the metal plate 20 and the metal plate 30 due to the action of such a reaction force. With such an auxiliary lock structure, even in a case where the resin portion 14 softens or melts under a high temperature environment, the metal plate 20 and the metal plate 30 can be hard to disassemble from each other. The same can be applied to the relationship between the metal plate 20 and the metal plate 40. This accordingly makes it possible to effectively restrain the battery cells 2 from falling apart due to the disassembling between the metal plates.

Further, with the manufacturing method of cell case 10 according to the present embodiment, the hooks 28 and the openings 34, 44 are formed by press molding. Instead of such a technique, hooks may be formed by joining metal members to the metal plate 20 by other techniques such as welding, for example. In the meantime, with the manufacturing method of the present embodiment, only by additionally performing hook forming step S3 and opening forming step S4 using press molding on the metal plates 20, 30, 40 formed by press molding, it is possible to form the hooks 28 and the openings 34, 44. Accordingly, it is possible to minimize addition of manufacturing steps and to manufacture the cell case 10 that is able to restrain disassembling between a plurality of metal plates.

Further, the manufacturing method of the cell case 10 according to the present embodiment includes temporary assembling step S5. Hereby, it is possible to integrally carry the metal plates 20, 30, 40 formed by pressing as a subassembly. Accordingly, it is possible to easily set the metal plates 20, 30, 40 to the metal mold of the injection molding machine in comparison with a case (that is, a case where the temporary assembling step is not performed) where the metal plates 20, 30, 40 formed by pressing are individually set in the metal mold. As a result, manufacture man-hours decrease, thereby making it possible to decrease the manufacturing cost of the cell case 10.

2. Embodiment 2

Figure 11A:
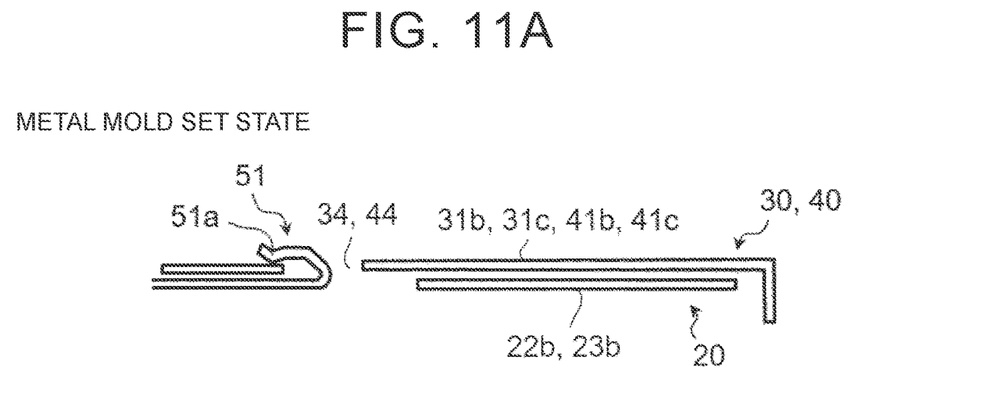
FIG. 11A is a view to describe a configuration of a hook including a contacting projection according to Embodiment 2.
Figure 11B:
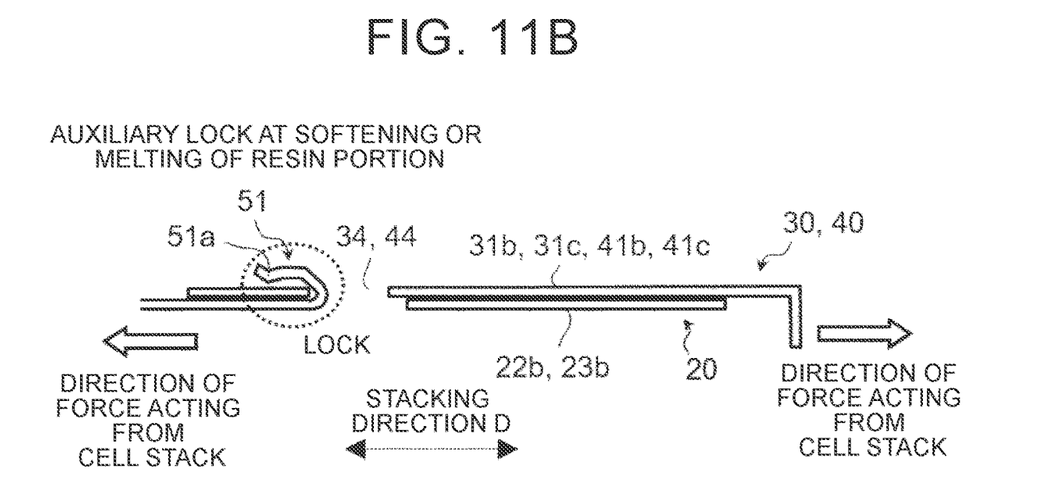
FIG. 11B is a view to describe the configuration of the hook including the contacting projection according to Embodiment 2.

A cell case 50 according to Embodiment 2 is different from the cell case 10 according to Embodiment 1 in the shape of the "hook." FIG. 10 is a perspective sectional view to describe a configuration of the cell case 50 according to Embodiment 2. More particularly, FIG. 10 illustrates the configuration of the cell case 50 near an end part of the side wall portion 22 on the side wall portion 31 side in an enlarged manner. FIGS. 11A, 11B are views to describe a configuration of a hook 51 including a contacting projection Ma according to Embodiment 2. More particularly, FIG. 11A illustrates a state where the metal plates 20, 30 are set in the metal mold of the injection molding machine. FIG. 11B illustrates an auxiliary lock state at the time of softening or melting of the resin portion 14.

As illustrates in FIGS. 10, 11A, 11B, the hook 51 is formed in the overlapped portion 22b of the side wall portion 22 in addition to the hooks 28. The contacting projection 51a projecting toward the overlapped portion 31b of the side wall portion 31 is formed in the hook 51. In a metal mold set state illustrated in FIG. 11A, the overlapped portion 31b on the metal plate 30 side makes contact with the contacting projection 51a directly (that is, without the resin portion 14). As such, the metal plate 20 directly makes contact with the metal plate 30 via the contacting projection 51a (stated differently, only in a part where the contacting projection 51a is provided).

With the contact structure described above, it is possible to easily form electrical conduction between the metal plate 20 and the metal plate 30 by use of the hook 51. Further, the hook 51 is also provided in the overlapped portion 22b on the side wall portion 41 side that is not illustrated in FIG. 10, similarly to the example illustrated in FIG. 10. Hereby, it is possible to easily form electrical conduction between the metal plate 20 and the metal plate 40 by use of the hook 51.

Accordingly, it is possible to achieve electrical conduction between three metal plates 20, 30, 40 connected via the resin portion 14 (that is, the three metal plates 20, 30, 40 placed to be separated from each other). This allows the three metal plates 20, 30, 40 to be equipotential, thereby making it possible to secure grounding without providing an earthed line for each of the metal plates separated from each other. That is, by connecting an earthed line only to either one of the three metal plates 20, 30, 40, it is possible to ground the whole cell case 50.

Further, as illustrated in FIG. 11B, with the hook 51 of the present embodiment, even in a case where the resin portion 14 softens or melts under a high temperature environment, when the opening 34 is caught on the hook 51, the metal plate 20 and the metal plate 30 can be hard to disassemble from each other. As such, the hook 51 has a function to restrict relative displacement between the metal plate 20 and each of the metal plates 30, 40 and also has a function to secure electrical conduction between the metal plate 20 and each of the metal plates 30, 40.

In addition, in the example illustrated in FIG. 10, one of the three hooks 28 illustrated in the example illustrated in FIGS. 6A, 6B is replaced with the hook 51 including the contacting projection 51a. Instead of such an example, two or three among the three hooks 28 may be replaced with the hooks 51. Further, the above contact structure using the contacting projection 51a is provided on the side wall portion 22 side in the metal plate 20. However, instead of this, the contact structure may be provided on the side wall portion 23 on the side opposite from the side wall portion 22 or may be provided on both of the side wall portions 22, 23.

Figure 12:
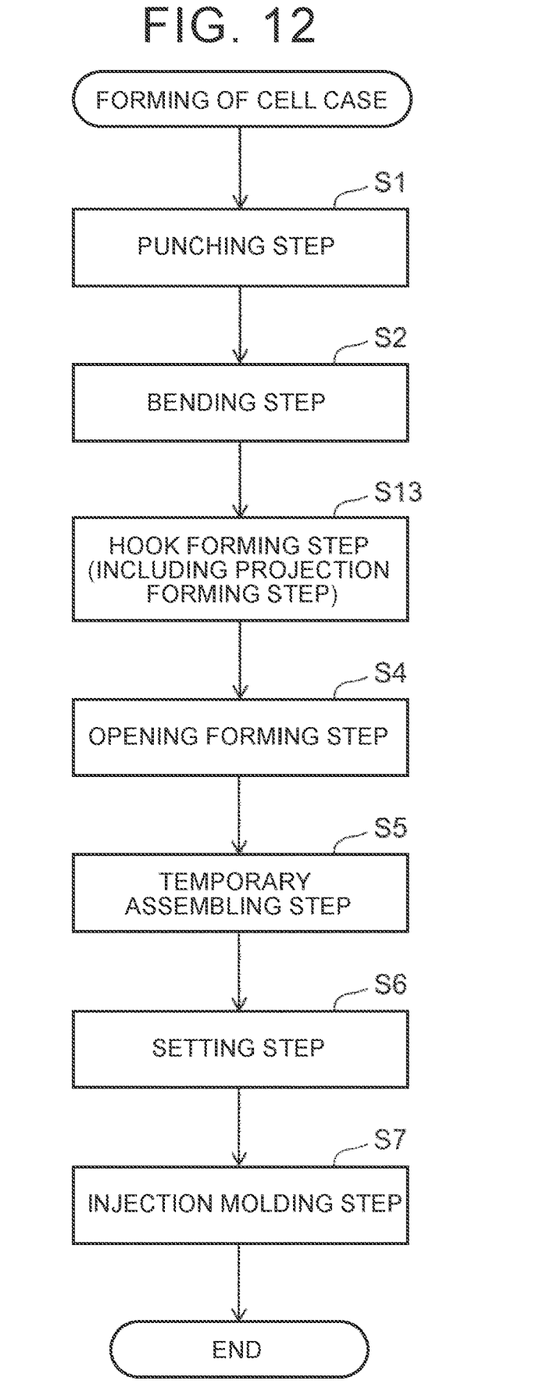
FIG. 12 is a flowchart illustrating the procedure of a manufacturing method of the cell case according to Embodiment 2.

FIG. 12 is a flowchart illustrating the procedure of a manufacturing method of the cell case 50 according to Embodiment 2. The manufacturing method illustrated in FIG. 12 is similar to the manufacturing method illustrated in FIG. 7 except that hook forming step S3 is replaced with hook forming step S13.

More specifically, hook forming step S13 is different from hook forming step S3 (see FIG. 7) in that hook forming step S13 includes a projection forming step of forming the contacting projection 51a by press molding. As such, in the manufacturing method of the cell case 50 of the present embodiment, the contacting projection 51a is formed by press molding. Instead of such a technique, the contacting projection may be formed by joining a metal member to the hook 51 by other techniques such as welding, for example. In the meantime, with the manufacturing method of the present embodiment, it is possible to form the hook 51 including the contacting projection 51a only by additionally perform the projection forming step using press molding on the hook 51 formed by press molding. Accordingly, it is possible to minimize addition of manufacturing steps and to manufacture the cell case 50 that is able to secure contact between a plurality of metal plates.

Figure 13:
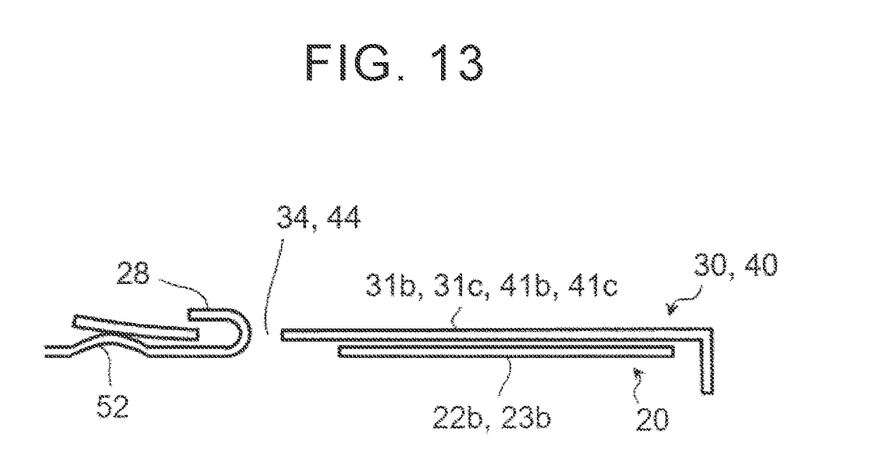
FIG. 13 is a view to describe an auxiliary lock structure with a contact structure according to a modification of Embodiment 2.

FIG. 13 is a view to describe an auxiliary lock structure with a contact structure according to a modification of Embodiment 2. The following description deals with an example of the relationship between the metal plate 20 and the metal plate 30, but the following description can be also applied to the relationship between the metal plate 20 and the metal plate 40.

In the hook 51 described above, the contacting projection 51a is formed in the hook 51. In the meantime, a contacting projection 52 in the example illustrated in FIG. 13 is formed in the overlapped portion 22b, 23b (the first overlapped portion) at a position different from the hook (for example, the hook 28) such that the contacting projection 52 projects toward the overlapped portion 31b, 31c (the second overlapped portion).

The overlapped portion 31b, 31c directly makes contact with the contacting projection 52. More particularly, as illustrated in FIG. 13, the height of the contacting projection 52 may be set to be larger than a gap between the overlapped portion 22b and the overlapped portion 31b so that the overlapped portion 31b runs onto the contacting projection 52. This makes it possible to surely achieve contact (electrical conduction) between the metal plate 20 and the metal plate 30.

In addition, the contacting projection 52 is formed by press molding. The contacting projection 52 may have the same shape (for example, the abovementioned arch shape) as the arch-shaped projections 27 formed in the side wall portion 22 of the metal plate 20 for the abovementioned entangled structure, for example. That is, the projections for the entangled structure may also serve as the contacting projections in the contact structure. Hereby, it is possible to secure contact between the metal plates without the need to form an exclusive projection for the contact structure. Further, in a case where the contacting projection is formed by raising part of the overlapped portion 22b, the contacting projection may be formed by use of an emboss shape without the opening (see FIG. 6B), instead of the arch shape.

3. Other Embodiments

Embodiments 1, 2 deal with the metal plate portion 12 constituted by the three metal plates 20, 30, 40. However, the "metal plate portion" according to this disclosure may be constituted by two metal plates or four or more metal plates. In order that the metal plates are hard to disassemble from each other in a case where the resin portion softens or melts under a high temperature environment, the metal plates should be each configured such that the relationship between the "first metal plate" and the "second metal plate" according to this disclosure is satisfied by a pair of metal plates adjacent to each other among the metal plates. Further, in a case where electrical conduction between the metal plates is secured by use of a contacting projection, the metal plates should be each configured such that the relationship between the "first metal plate" and the "second metal plate" according to this disclosure is satisfied by a pair of metal plates adjacent to each other among the metal plates.

Further, Embodiments 1, 2 deal with the "stacking direction D" of the cell stack 3 as one example of the "direction where the first metal plate and the second metal plate are separated from each other" according to this disclosure. However, instead of the stacking direction, the "hook" according to this disclosure may be formed to restrict relative displacement between the first metal and the second metal along another direction where the first metal plate and the second metal plate are separated from each other, depending on how to divide the metal plates.

What is claimed is:

1. A cell case in which one or more battery cells are accommodated, the cell case comprising:
   a metal plate portion including a plurality of metal plates constituting a first part of the cell case and placed such that the metal plates are separated from each other; and
   a resin portion provided between the metal plates such that the resin portion connects the metal plates, the resin portion constituting a second part of the cell case, wherein:
   the metal plates include a first metal plate and a second metal plate;
   the first metal plate and the second metal plate include a first overlapped portion and a second overlapped portion, respectively, such that the first overlapped portion and the second overlapped portion overlap with each other via the resin portion;
   the first overlapped portion includes a hook;
   the second overlapped portion has an opening;
   the hook is formed to be caught on the opening to restrict relative displacement between the first metal plate and the second metal plate along a direction where the first metal plate and the second metal plate are separated from each other;
   the hook is provided at a side wall portion of the first overlapped portion;
   the opening is provided in an extending part of the second overlapped portion, the extending part (i) extending from a bending part of the second overlapped portion and parallel to the side wall portion of the first overlapped portion and (ii) overlapping with the side wall portion; and
   a gap between the hook and the extending part is filled with a portion of the resin portion.

2. The cell case according to claim 1, wherein:
   the one or more battery cells form a cell stack as a stacked body constituted by a plurality of battery cells stacked in a stacking direction; and
   the direction where the first metal plate and the second metal plate are separated from each other is a direction parallel to the stacking direction.

3. The cell case according to claim 1, wherein:
   the first overlapped portion includes a contacting projection formed in the hook or formed in the first overlapped portion at a position different from the hook such that the contacting projection projects toward the second overlapped portion; and
   the second overlapped portion directly makes contact with the contacting projection.

4. The cell case according to claim 1, wherein projections having an arch shape are respectively provided the first metal plate and the second metal plate such that an entangled structure is provided with the projections, the first metal plate, and the second metal plate.

* * * * *